April 16, 1963
H. E. HELD
3,086,150
CAPACITOR
Filed July 24, 1959
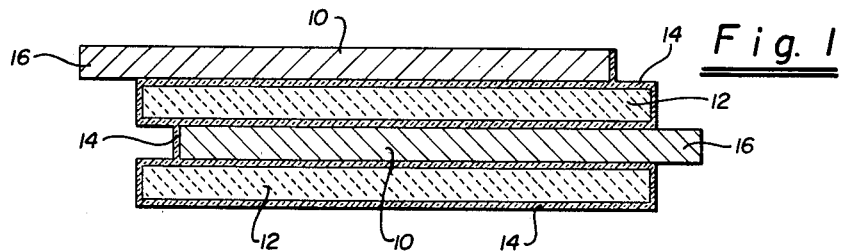
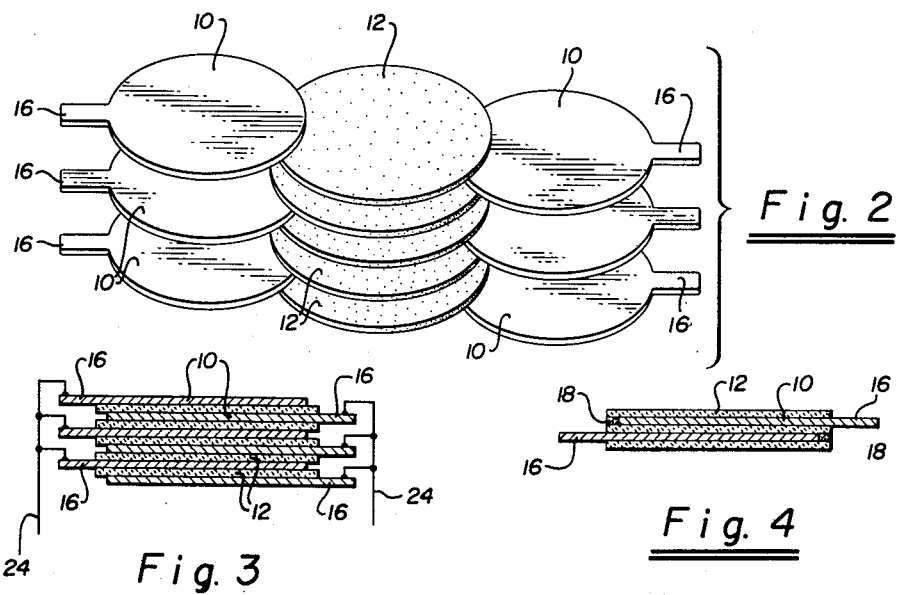
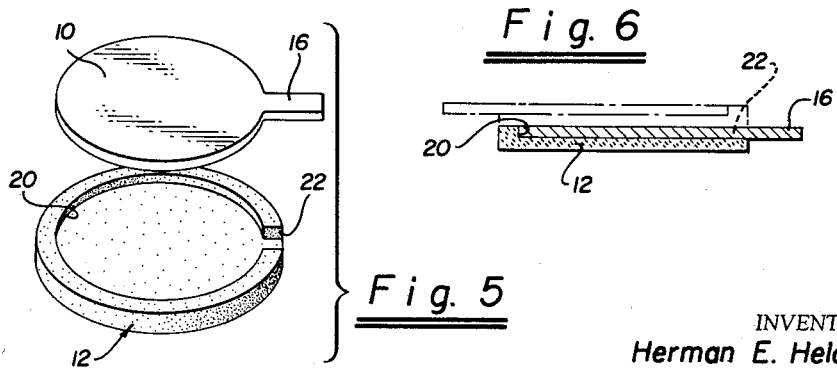
INVENTOR
Herman E. Held
BY Flehr & Swain
ATTORNEY United States Patent Office 3,086,150
Patented Apr. 16, 1963

3,086,150
CAPACITOR
Herman E. Held, 24 Adam, Atherton, Calif.
Filed July 24, 1959, Ser. No. 829,311
5 Claims. (Cl. 317—258)

This invention relates generally to the arrangement of conductors and dielectric material in a capacitor for purposes of securing an appreciable capacitance and particularly to such an arrangement adapted to effective operation under conditions of very high voltage and temperature.

The essential feature of any capacitor is the provision of two or more conductors separated by a dielectric material. Many modern capacitors for low voltage operation consist of alternate metal and dielectric plates or sheets, which sometimes comprise metal or foil separated by electrical insulating materials such as wax paper, plastic, mica, etc. For higher values of capacitance, it is necessary to use thinner layers of a material of higher dielectric value and strength. This is because the value of capacitance, although increasing with the dielectric constant and area of the dielectric, decreases with the thickness of the dielectric. Thus, the thinner the dielectric, the higher the capacitance. By way of illustration, relatively high values of capacitance have been obtained with very thin films of a dielectric, such as tantalum oxide film on tantalum metal plates, or aluminum oxide on aluminum plates.

Despite a wide variety in the arrangement of conductors and dielectric in the formation of capacitors, no arrangement to date has been entirely successful in providing a compact, low cost, rugged capacitor that will successfully operate at high voltages and particularly at high temperatures (e.g. 1000° F. and over). Materials possessing high dielectric constant are generally subject to deterioration or to a wide variance in the value of the constant with changes in temperature and particularly upon increase of operating temperatures into the range indicated. On the other hand, materials which are stable at high temperatures or possess relatively stable dielectric constant have not been found to possess sufficient dielectric strength to resist voltage breakdown. It follows that a capacitor capable of effective operation at high voltage and temperature should be capable of resisting effects of such temperature and have a sufficiently high dielectric strength to resist voltage breakdown and a relatively high temperature stable dielectric constant to insure a desired uniform value of capacitance. Obviously a dielectric material possessing these characteristics is highly to be desired.

In general, it is an object of the present invention to provide a capacitor in which the dielectric possesses both high dielectric strength and a high, temperature stable dielectric constant.

It is another object of the invention to provide a capacitor of the above character which is capable of reliable, effective operation at very high voltages, and at temperatures ranging up to 1000° F. and higher, in rugged compact form.

Another object of the invention is to provide such a capacitor which is highly resistant to voltage discharge and to deterioration occasioned by moisture and other corrosive agents normally encountered in service.

Other objects and advantages of the invention will be apparent from the following description of an exemplary embodiment thereof, and from the drawing in which:

FIGURE 1 is an enlarged sectional view of a section of a capacitor embodying the principles of the invention;

FIGURE 2 is an exploded view of the components of a capacitor illustrating details of its construction and assembly;

FIGURE 3 is a schematic view in section, illustrating the manner of connecting the capacitor into an electrical circuit;

FIGURE 4 is a like view showing a modified form of the invention;

FIGURE 5 is an exploded view in perspective of a further modified form of the invention; and FIGURE 6 is a sectional view showing the manner of assembly of the device of FIGURE 5.

Generally stated, the present invention is predicated on my discovery that dense, nonporous, high strength aluminum oxide ceramics possess an unexpected stability of dielectric constant with variation in temperature along with exceptional dielectric strength. It is also predicated on my discovery that a capacitor composed of alternate layers of this ceramic material with a noble metal will operate with exceptional effectiveness at very high voltages and at temperatures in excess of 1000° F. In addition, such capacitors are easily fabricated, light in weight, durable, and highly adaptable for use in the electric and electronic industries.

The aluminum oxide employed as a dielectric herein, should be dense, nonporous and of high mechanical strength. It should have an aluminum oxide content of at least 85% and preferably about 95% to 100% aluminum oxide ($Al_2O_3$). It should also have a dielectric constant of the order of 9 to 10. I have found that aluminum oxide ceramics of the character described have a dielectric constant which does not vary more than 10% over the range of temperatures from 0° up to 1000° F. In addition, such dielectric has a very high dielectric strength which does not appreciably vary over this range of temperatures. For example, its dielectric strength at 500° F. determined for a thickness of the dielectric of 0.001 inch, is over 500 volts. At 1000° F. the dielectric strength is still at a relatively high value of 175 volts.

To take full advantage of the high temperature, high voltage properties of the aluminum oxide ceramic, in a capacitor, the material employed as a conductor should be capable of withstanding all temperatures within the indicated operating range, without deterioration due to oxidation or other causes. It should also be resistant to corrosion. I have found that the noble metals are particularly suited for the purpose since they will withstand temperatures in excess of 1000° F., are noncorrosive, and are excellent conductors. As referred to herein the term "noble metals" is intended to include gold, silver, metals of the platinum group (e.g. iridium, osmium, palladium, rhodium, and ruthenium), and alloys of these metals with one another.

In fabricating a capacitor in accordance with the invention, I prefer to employ alternate thin wafers or layers of aluminum oxide ceramic shapes and noble metal, in the manner indicated in FIGURE 2. Any number of the alternate ceramic and metal wafers or disks can be stacked in this fashion, prior to consolidating in a furnace. In a preferred procedure, the ceramic disks are first coated with a thin film of a ground glass which can be applied by spraying, silk screening, dusting, or by dipping the ceramic disks into the powdered glass material. The glass employed should be one that does not soften at the maximum operating temperature of the capacitor and which has a flow point under the melting point of the conductive metal. The glass also should have a low electrical loss factor, possess a reasonably high dielectric strength, and be resistant to deterioration by moisture or other corrosive agents of the type normally encountered in service. A number of the boro silicate glasses possess these characteristics, for example, such glasses containing about 10 to 13% of $B_2O_3$ and 80 to 83% silica.

Referring again to FIGURE 2, the metal wafers 10 of conductive material are positioned between the glass coated ceramic wafers 12 and the entire unit assembled into a stacked assembly, for example, as in FIGURE 3. The stacked assembly is then transferred to a furnace and heated to a temperature above the melting point of the glass employed, but below that of the metal. The glass on softening, flows over the surface of the ceramic and the adjacent metal of the conductors and bonds them together. This bonding of the disks 10 and 12 is illustrated in detail at 14 in FIGURE 1. Upon cooling, the resulting capacitor can be used in the manner of any conventional capacitor, and to facilitate such use the conductors 10 are preferably provided with extending terminal portions 16. These terminals can be positioned to face in opposite directions to minimize voltage discharge between adjacent conductors. The terminals on a side can also be aligned with one another to facilitate connections in parallel or at the same potential, for example, as in FIGURE 3.

In constructing the capacitors of the invention, it is desirable that the possibility of voltage discharge between conductors around the ends of the ceramic wafers, be reduced to a minimum. In the embodiment of FIGURES 1 to 3 this is accomplished by making the conducting wafers 10 substantially smaller in diameter than the dielectric wafers 12. This has the effect of substantially lengthening the leakage or voltage discharge path between adjacent metal conductors. An alternative construction illustrated in FIGURE 4, is to additionally fill the voids between the alternate wafers with insulating deposits 18 of glass. These deposits are preferably positioned adjacent the peripheral edge of the conducting wafers 10, and are fused to the ceramic dielectric material. A further variation illustrated in FIGURES 5 and 6 is to construct the wafers 12 with a central recess 20 adapted to receive the conducting wafers 10. Axial passages 22 can be provided to accommodate the extending terminals 16.

In the use of the described capacitor, selected terminals 16 can be connected into the circuit by any suitable conductive means, such as a copper conductor or other electrical conductor 24. However, for high temperature operation, the conductors 24 should at least be as resistant to high temperatures as the materials of the capacitor itself, and preferably should be of the same metal as used for the conductive wafers 10. The junctures between the terminals and the conductors should also be resistant to high temperatures, for example through use of resistance welding or an oxidation resistant brazing alloy.

From the foregoing, it should be apparent that the present invention makes possible a lightweight capacitor which is not only capable of effective operations at very high temperatures (in excess of 1000° F.) but also at very high voltages.

To those skilled in the art to which this invention relates, many changes in construction and widely differing embodiments and applications of the invention will suggest themselves without departing from the spirit and scope thereof. By way of illustration, the conductors 10 need not be constructed as layers or plates of a solid material, but may comprise a conductive medium placed on the ceramic wafers 12 by painting, plating, electro deposition, evaporation, etc. Likewise, other suitable media can be employed instead of glass for purposes of insulating and fusing the conductive and dielectric layers into a unit (e.g. various of the resins and plastic compositions especially designed for high temperature work such as heat resistant phenolics and similar materials). It should be understood therefore that the disclosures and the description herein are purely illustrative and not intended to be in any sense limiting.

I claim:

1. A lightweight capacitor adapted to operate at relatively high voltages and at temperatures up to 1000° F. and higher without deterioration or breakdown, comprising a self-supporting ceramic wafer of substantial thickness composed of dense nonporous aluminum oxide, said wafer being characterized by a relatively high and uniform dielectric strength and a substantially nonvarying dielectric constant over the temperature range up to about 1000° F., metal wafer conductors on each side of said ceramic wafer, said metal wafers being selected from the group of pure metals consisting of gold, silver, metals of the platinum group, and alloys of these metals with each other, and a thin layer of glass fused to exterior surface portions of said ceramic wafer and bonding said conductors thereto, said glass covering surface and peripheral edge portions of said ceramic wafer and filling void spaces between said wafer and adjacent conductors, whereby the glass serves not only to bond the ceramic wafer and conductors into an integral unit but also to increase the resistance of the leakage path around the ceramic wafer.

2. A capacitor as in claim 1 wherein said metal wafers are smaller in size than said wafers of aluminum oxide, and each is provided with a protruding terminal portion extending in a direction opposite to that of the terminal portion of the closest adjacent metal wafer.

3. A capacitor as in claim 1 wherein said glass employed as a surface coating has a reasonably high dielectric strength, a low electrical loss factor, and a softening point below that of the metal.

4. A lightweight capacitor adapted to operate at relatively high voltages and at temperatures up to 1000° F. and higher without deterioration or breakdown, comprising a plurality of self-supporting ceramic wafers of substantial thickness composed of dense nonporous aluminum oxide, said wafers being characterized by a relatively high and uniform dielectric strength and a substantially nonvarying dielectric constant over the temperature range up to about 1000° F., metal wafer conductors on each side of said wafers, said metal wafers being composed of pure metal selected from the group consisting of gold, silver, metals of the platinum group, and alloys of these metals with each other, and a thin layer of glass fused to exterior surface portions of said wafers and bonding the same into a stack of alternate ceramic and metal wafers, said glass covering exposed surface and peripheral edge portions of said ceramic wafers and filling void spaces between said ceramic wafers and adjacent metal wafers, whereby the glass serves not only to bond the wafers into an integral unit but also to increase the resistance of the leakage path around the ceramic wafers.

5. A capacitor as in claim 4 wherein central portions of said wafers of aluminum oxide are recessed to receive said metal wafers, the extending terminal portions of said metal wafers being accommodated by axial passages in side wall portions of said aluminum oxide wafers.

References Cited in the file of this patent

UNITED STATES PATENTS

| | | |
|---|---|---|
| 1,811,725 | Marckworth | June 23, 1931 |
| 2,223,833 | Sander | Dec. 3, 1940 |
| 2,238,031 | Brennan | Apr. 15, 1941 |
| 2,307,561 | Bailey | Jan. 5, 1943 |
| 2,552,653 | Stupakoff | May 15, 1951 |
| 2,566,666 | Khouri et al. | Sept. 4, 1951 |
| 2,614,524 | Haynes | Oct. 21, 1952 |
| 2,745,284 | Fitzgerald | May 15, 1956 |
| 2,758,267 | Short | Aug. 7, 1956 |
| 2,771,969 | Brownlow | Nov. 27, 1956 |
| 2,777,254 | Siefert | Jan. 15, 1957 |

FOREIGN PATENTS

| | | |
|---|---|---|
| 432,793 | Great Britain | July 30, 1935 |